United States Patent [19]

DaSilveira

[11] Patent Number: 4,930,452
[45] Date of Patent: Jun. 5, 1990

[54] CATTLE STANCHION

[76] Inventor: John A. DaSilveira, 25251 E. Mariposa Rd., Escalon, Calif. 95320

[21] Appl. No.: 396,102

[22] Filed: Aug. 21, 1989

[51] Int. Cl.$^5$ ............................................... A01K 1/00
[52] U.S. Cl. ................................................... 119/148
[58] Field of Search ..................... 119/147.1, 148, 149, 119/150, 98, 99

[56] References Cited

U.S. PATENT DOCUMENTS

| | | | |
|---|---|---|---|
| 1,286,441 | 12/1918 | Stevenson | 119/148 |
| 1,360,941 | 11/1920 | Hanson | 119/150 |
| 3,152,577 | 10/1964 | Sheriff | 119/99 |
| 4,037,566 | 7/1977 | Albers | 119/148 X |
| 4,185,592 | 1/1980 | Albeps, Sr. | 119/148 |
| 4,495,897 | 1/1985 | Albers, Sr. | 119/148 |

Primary Examiner—Gene Mancene
Assistant Examiner—R. Thomas Price
Attorney, Agent, or Firm—Basil B. Travis

[57] ABSTRACT

This improved cattle stanchion discloses an essentially coplanar and rectangular frame for automatically locking and manually releasing the heads of cattle. The frame unit consists of three vertical bars and two essentially horizontal bars, the top of which being slightly arched upwardly to form an apex over the center of the frame while the bottom bar is slightly arched downwardly to form a nadir under the center of the frame. These arches define an arc of travel for the central pivotally mounted vertical bar with an annular ring extension around the top arch of the frame. The annular ring cooperates with a locking mechanism consisting of pairs of elliptical latching sleeves mounted linearly apart and above the frame unit on a horizontal bar which may be operated by an attendant to either lock or unlock the stanchion.

9 Claims, 3 Drawing Sheets

CATTLE STANCHION

BACKGROUND OF THE INVENTION

1. Field of the Invention

The present invention relates to cattle stanchions with at least two parallel bars, one of which is pivotally mounted to admit and restrain the head of an animal, but more particularly, this invention relates to sets of cattle stanchions connected in an essentially straight line whereby two or more heads of cattle may be simultaneously locked or released by an attendant by movement of a single element.

2. Prior Art

A cattle stanchion is basically a frame that surrounds the head of an animal. A variety of such stanchions are commonly used today in the feeding of cattle, especially where numerous cattle are fed at one time so that each animal may be presented with an allocated amount of food and restrained in the feeding position while other animals may be individually released and segregated from the herd without the need to chase and isolate them by horse and lasso as was done in bygone years. This is particularly true in modern dairy operations where proper feeding of cattle is not only economically important, but are also milking operations and routine veterinary maintenance which requires that the animals be restrained.

A variety of cattle stanchions have emerged as prior art which disclose an essentially coplanar frame of vertical and horizontal bars in combination with automatically locking devices to admit, restrain or manually release the heads of cattle. The animal is enticed to place its head through the frame in order to reach the food which is usually placed in a trough on the other side. As the animal lowers its head to reach the food, the neck generally comes into contact with a movable stanchion bar and thereby causing it to lock into a vertical position. The head and neck of the animal is then free to move up and down, but not backwards or sideways, resulting in the animal's confinement.

However, virtually all known locking mechanisms of prior art stanchions that utilize couplers, pulleys or sliding rails in combination with springs, clips, pegs or pins cause excessive wear to these components and even an occasional injury to attendants or cattle. For example, the stanchions that use locking devices of springs and clips against a peg or pin are subjected to constant wear as the animal lowers and raises its head to feed. The tremendous force of the animal's neck exerted on the locking vertical stanchion bar is pulsated to these components and causes a chiseling effect which often severs a peg or pin. Even stanchions that use sliding rails and couplers have the same problems. Their latching devices become worn resulting in dangerous defects that need constant maintenance and repair.

Then, too, there is the problem with stanchion safety. Some locking devices actually require an attendant to place his fingers inside a pulley housing to release a spring clip from a peg. If an animal should violently move at that instant, the force of the animal's neck upon the vertical stanchion bar can result in the pulley being thrust laterally against the attendant's fingers causing a serious injury. The same is true with the stanchions that use a coupler in combination with a sliding rail. Where an attendant is required to manually release a coupling mechanism mounted directly on a rail, it can be forcefully thrown to the side by the animal, causing serious injury to the attendant.

Cattle have also been killed by stanchions. They are not the smartest animals and sometimes incorrectly position their heads between the wrong bars of poorly designed stanchions. Some animals will attempt to lie down while in the stanchion, resulting in oblique positioning of their necks and resulting in strangulation.

Accordingly, it is the general object of the present invention to provide a self-locking and manually unlocking cattle stanchion with a simplified locking device that requires minimal maintenance and repair, yet is strong enough to restrain full grown cattle and resist wear.

It is another object of the present invention to provide a cattle stanchion whereby cattle may be fed when the stanchion is either locked or unlocked without injury by incorrectly positioning their heads or lying or falling down.

It is yet another object of the present invention to provide a cattle stanchion where individual animals may lock themselves into the stanchion when a locking mechanism is in a locked position, but may not lock themselves into the stanchion when the locking mechanism is in an unlocked position.

It is still another object of the present invention to provide a locking mechanism for a cattle stanchion whereby all animals may be simultaneously released or individual animals may be safely released by an attendant without injury to the attendant.

The present invention achieves these objectives.

SUMMARY OF THE INVENTION

The present invention provides an improved stanchion apparatus for admitting and releasably restraining the heads of cattle.

A locking mechanism of the improved stanchion apparatus may be set to either a locked or unlocked position by an attendant. If at locked position, the animal will cause itself to be locked into the stanchion frame. As the animal lowers its head to eat, its neck presses against the lower part of a central pivotally mounted bar causing it to pivot to a vertical position where it is locked by the locking mechanism. If the locking mechanism is at unlocked position, the animal may freely remove its head from the stanchion, but more importantly, if the animal should either lie down or fall down, the central pivotally mounted vertical bar will automatically swing open, thereby allowing the animal more room to free itself from the frame.

The essentially coplanar frame unit of the improved stanchion has three vertical bars, the center pivotally mounted bar and two outer stationary vertical bars which are connected to two essentially horizontal bars. The top horizontal bar is arched slightly upward to form an apex over the center of the frame while the bottom bar is arched slightly downwardly to form a nadir under the center of the frame.

The top and bottom arches of the improved stanchion frame define an arc of lateral travel for the ends of a central pivotally mounted vertical bar, the top of which has an annular ring extension encircling the upper arch of the frame and forms part of the locking mechanism. The bottom of the pivotal bar has an angular weight projection which acts as a barrier to prevent cattle from incorrectly positioning their heads in the frame and also causes the pivotal bar to remain open when not locked. This frame with pivotal bar is believed to be one of the most important features and improvements over the prior art because when unlocked the stanchion provides a greater open area at the top of the frame for an animal to remove its head even if incorrectly positioned obliquely.

The locking mechanism is controlled by a horizontal locking bar linearly mounted over the top of the frame so that it may be rotated around its longitudinal axis between a locked unlocked position by a locking lever as defined by a locking yoke.

A pair of elliptical latching sleeves are mounted apart coaxially on the horizontal locking bar to define a notch between the sleeves and above the arch of the frame for trapping the edge of the annular ring extension of the central pivotally mounted vertical bar, but only when the locking bar is rotated to cause the major axes of the elliptical latching sleeves to project downwardly into the plane of the frame. In this locked position an individual latching sleeve may be safely and manually lifted by an attendant to free the pivotal bar without coming into contact with it, or the attendant may rotate the locking bar to cause the major axes of the latching sleeves to project perpendicularly to the plane of the frame and release the pivotal bar by manually operating the locking lever.

The option of release is another advantage because one embodiment of the present invention provides for a plurality of unit frames attached linearly to accommodate a large number of cattle yet controlled by a single locking bar to automatically admit and restrain them, or simultaneously or individually release them.

These advantages, among others, will become apparent from the following description, the accompanying drawings and appended claims.

DETAILED DESCRIPTION OF THE PREFERRED EMBODIMENTS

Figure 1:
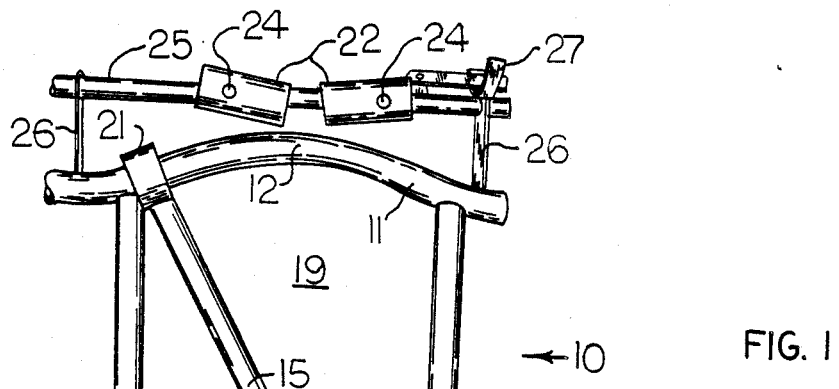
FIG. 1 is an elevational view of a single improved stanchion frame unit with the pivotal bar unlocked but the locking bar in the locked position ready to latch the ring of the bar.

Referring now to FIG. 1, references numeral 10 generally illustrates an improved stanchion unit of the present invention, which is preferably made from various size pieces of shaped steel pipe welded together. However, it should be pointed out that the improved stanchion could as well be manufactured from other materials such as metal rods, angle iron, plastic tubes, so that for the purpose of this description the term "bar" as used hereinafter shall be understood to include these kinds of materials even though steel pipe is presently preferred due to its strength.

As shown in FIG. 1, the stanchion 10 has basically two parts. An essentially lower coplanar frame and an upper locking mechanism. The frame is fundamentally rectangular with exception that the upper horizontal bar 11 is arched slightly upward to form an apex 12 over the center of the frame, and the lower horizontal bar 13 is arched slightly downward to form a nadir 14 under the center of the frame. This bending of the bars is important so that the central pivotally mounted vertical bar 15 can pivot laterally on its axel 16. A lateral arm extension 17 provides central support for the axel 16 and pivoting bar 15 and is attached to one of the two stationarily mounted vertical bars 18 which define and limit the arc of travel within the frame 10.

When an animal inserts its head into the opening of the frame 19 the pressure of its neck on the lower portion of the pivotable bar 15 causes it to pivot laterally to a vertical limit as defined by an angular weight projection 20 in contact with a vertical bar 18. This angular weight projection not only causes the pivotal bar 15 to remain open by gravity when not locked, but also prevents an animal from incorrectly positioning its head in the frame.

An annular ring extension 21 at the top of the pivotal bar 15 travels coaxially around the arch of the frame 11 as caused by the downpressure of the animal's neck on the bar 15. If the locking mechanism, hereinafter more fully described, is in the locked position as illustrated in FIG. 1, the annular ring 21 will be latched at the apex of the frame 12 and the animal restrained. If the locking mechanism is unlocked, the annular ring 21 will remain unlatched and the animal may freely remove its head even if obliquely positioned in the frame opening 19 because the pivotal bar 15 swings laterally and allows more open area in combination with the arch 11 of the frame 10 than is found in other stanchions. This feature is believed to be a major improvement over the prior art.

Figure 2:
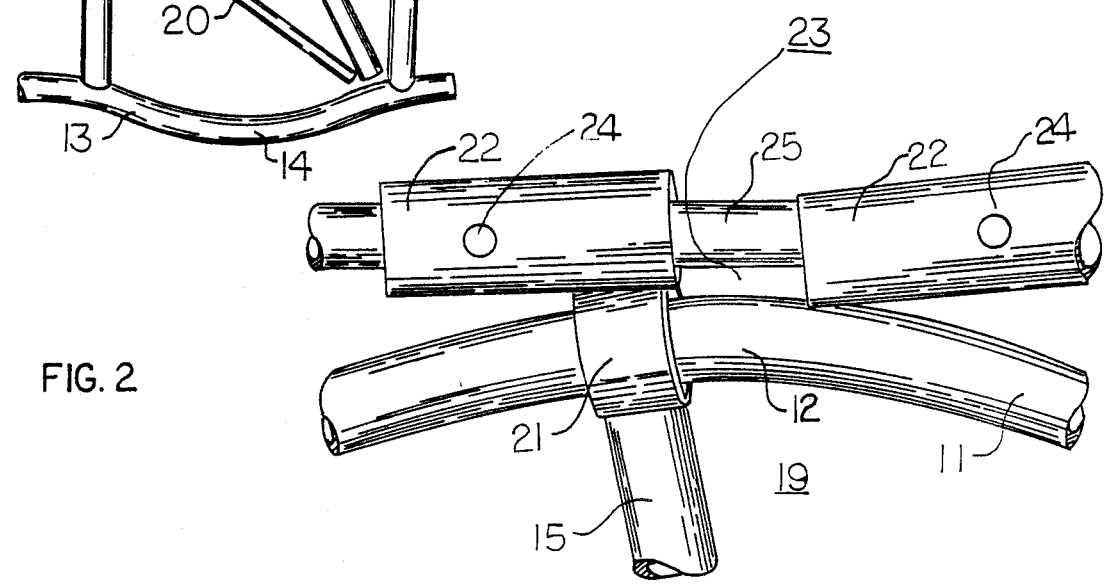
FIG. 2 is a detailed view of the ring sliding under and lifting a latching sleeve.
Figure 3:
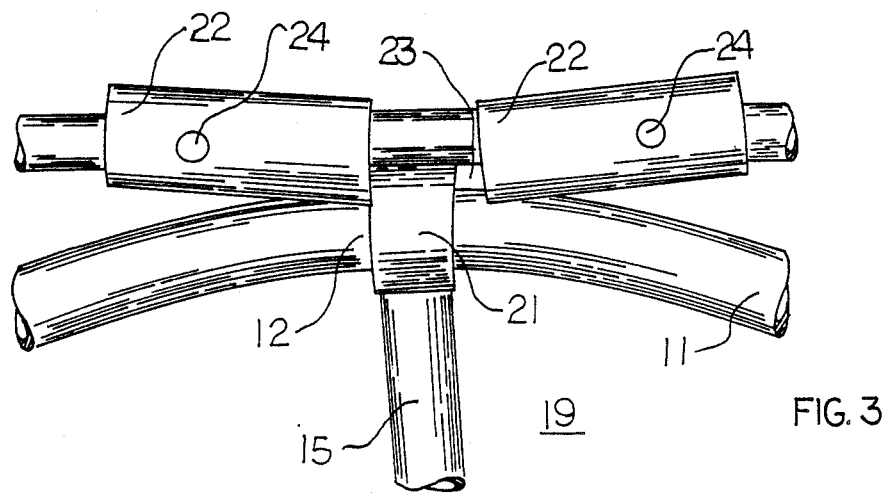
FIG. 3 is a detailed view of the ring latched into the notch between the latching sleeves.

The locking mechanism, partially detailed in FIGS. 2 and 3, cooperates with the annular ring 21 of the pivotal bar 15. In FIG. 2 the edge of the annular ring 21 is illustrated sliding beneath an elliptical latching sleeve 22 thereby lifting it momentarily so that the ring 21 may be trapped in a notch 23 between the two latching sleeves 22, as illustrated in FIG. 3.

Figure 4:
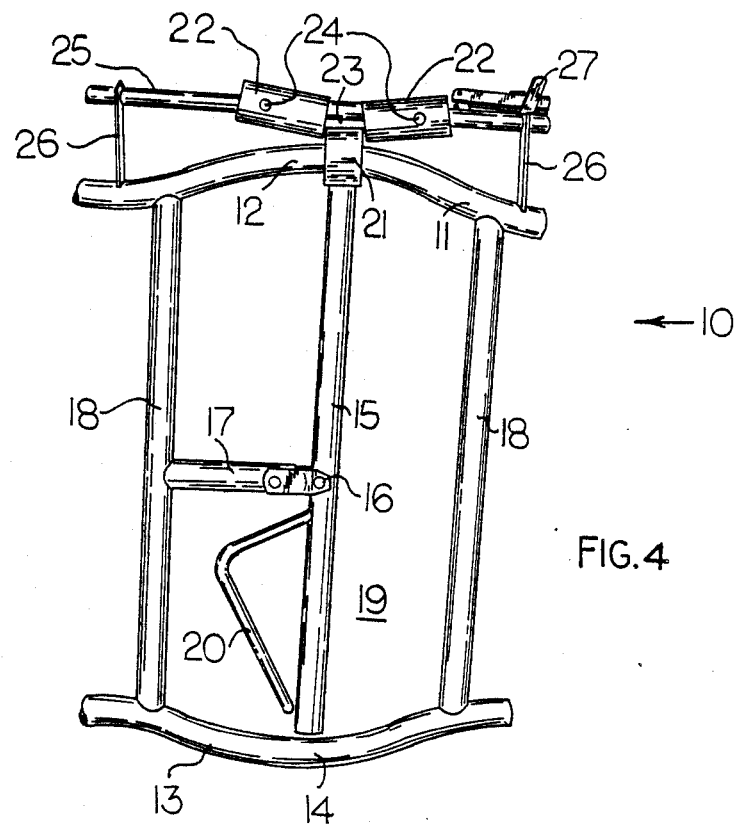
FIG. 4 is an elevational view of the single frame unit in a locked and latched position.

FIG. 4 shows the frame 10 in full locked position. The latching of the annular ring 15 is made possible only by the pair of elliptical latching sleeves 22, spaced apart to form a notch 23 between them and directly over the apex 12 of the frame 10. The sleeves are preferably made by deforming steel pipe by pressure so that its cross-section becomes elliptical. It is very important that these sleeves 22 are pivotally pinned 24 to a horizontal locking bar 25 through their minor axes and off-center, as illustrated in detail in FIGS. 2 and 3, to cause their proximal ends near the apex 12 of the frame 10 to project downward by gravity when the locking bar 25 is rotated to the locked position. This locking and latching feature is believed to be another major improvement over all known stanchions because it works basically on the principle of gravity and thus eliminates the need for springs, clips, pegs, couplers and rails which have heretofore presented the problems mentioned.

Figure 5:
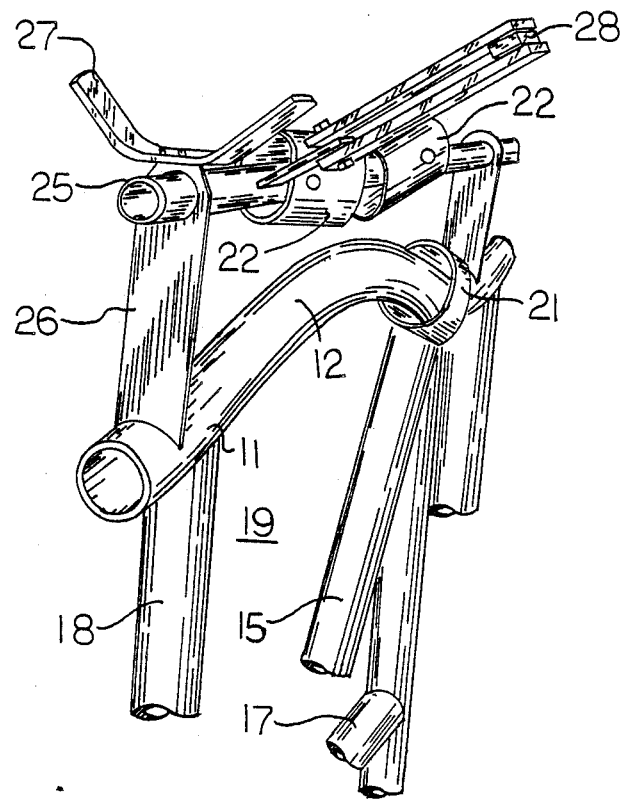
FIG. 5 is a detailed end view of the latching yoke and latching lever.
Figure 6:
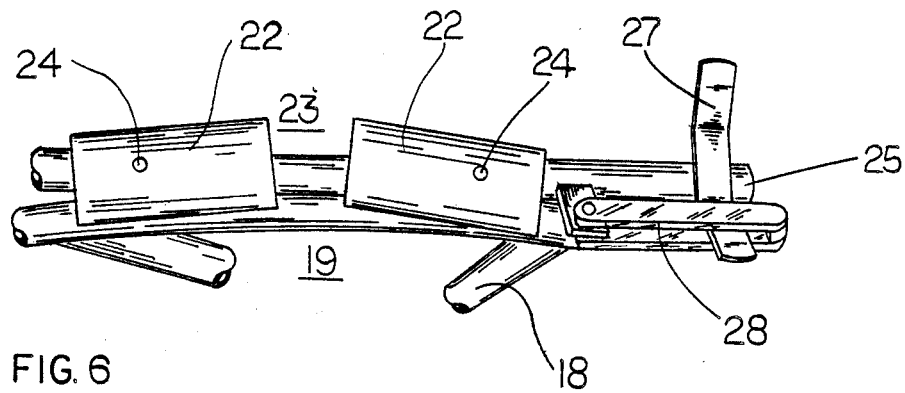
FIG. 6 is a detailed top view of the locking mechanism in the unlocked position.

The horizontal locking bar 25, as best shown in FIGS. 1, 4 and 5, is preferably made of linear steel pipe held horizontally and linearly above the frame 10 by two vertical steel brackets made from strap-steel and welded to the frame 10. Circular housings in each end of the brackets 26 allow the locking bar 25 to be rotated around its linear axis between a locked and unlocked position defined by a locking yoke 27 also formed from strap-steel and welded on the top of a bracket 26. A locking lever 28, as best shown in FIGS. 5, 6 and 7, is pivotally positioned on the locking bar 25 for its manual rotation and can be fastened to either the locked or unlocked position arms of the locking yoke 27, which correspond to the direction of the major axes of the locking sleeves 22.

Figure 7:
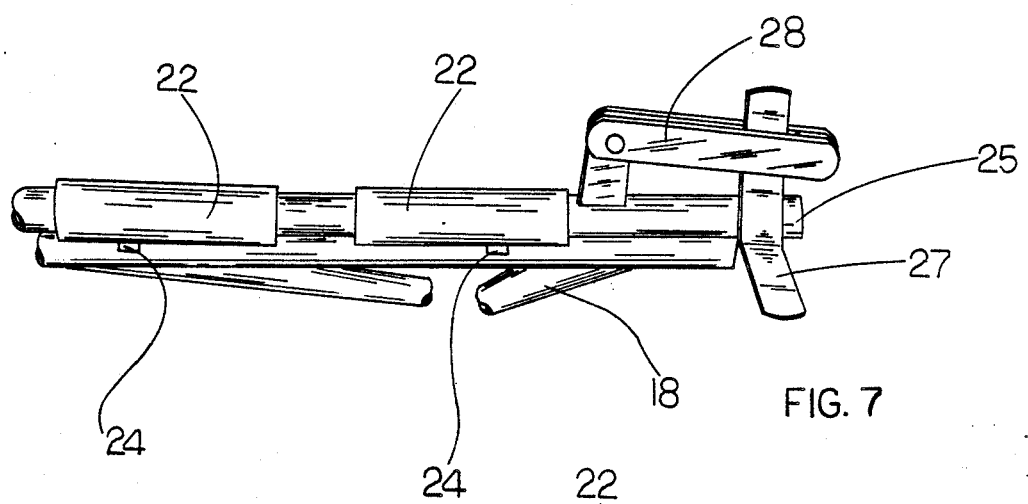
FIG. 7 is a detailed top view of the locking mechanism in the locked position.

As shown in detail in FIG. 7, even though the locking bar 25 is in the locked position, a latching sleeve 22 may be manually grasped by an attendant and pulled upwardly along its major axis thereby releasing the pivotal bar 15 without the need to rotate the locking bar 25. This is an important concept for releasing individual animals where several frames 10 are attached to each other.

Figure 8:
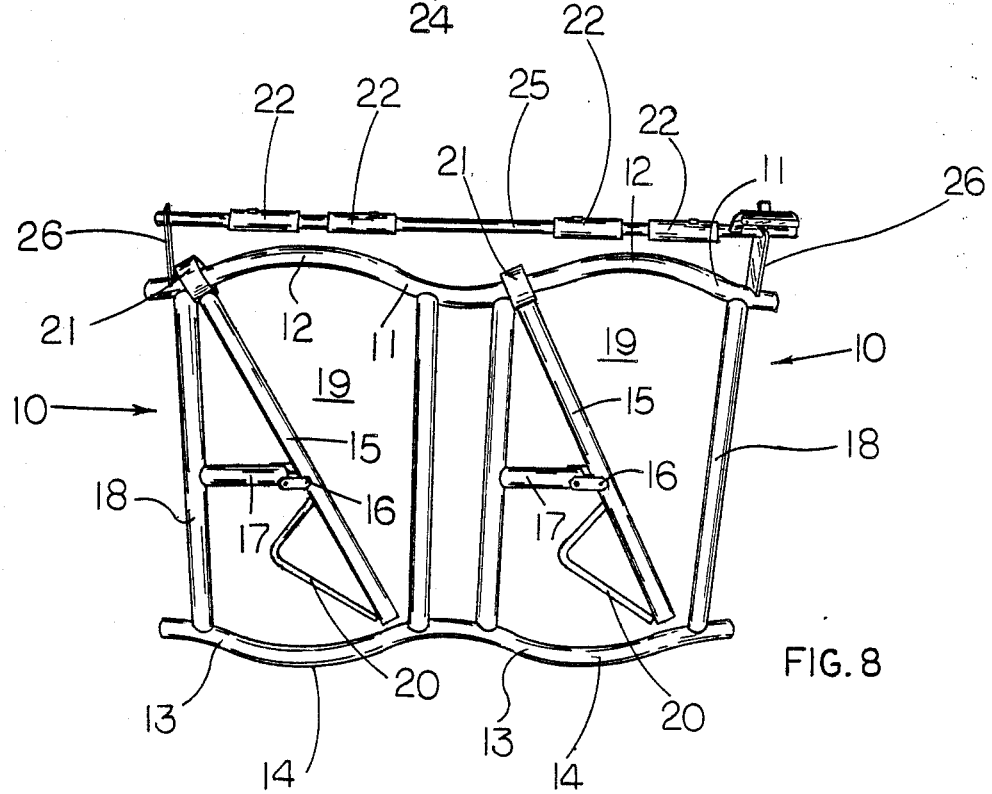
FIG. 8 is an example of a preferred embodiment of the invention extended linearly.

Turning now to FIG. 8, there is illustrated an example of another preferred embodiment of the improved cattle stanchion. This is a multiple stanchion operated by a single locking bar 25 above the laterally connected stanchion frame units 10. Although two frame units are shown by way of an example, in actual practice it is more economical and practical to manufacture and install the multiple stanchion comprising four frame units, however, it should be understood that the length of the multiple stanchion does not depart from the principle, scope and spirit of the invention as described.

I claim:

1. A self-locking and manually unlocking cattle stanchion comprising an essentially coplanar frame of connecting vertical and horizontal bars for automatically admitting and releasably restraining the necks of cattle, said stanchion frame consisting of attachable single frame units of three vertical bars and two essentially horizontal bars, the top of said horizontal bars being slightly arched upward to form an apex over the center of the frame and the bottom of said horizontal bars being slightly arched downwardly to form a nadir under the center of the frame, said top and bottom arches defining an arc of travel for a centrally mounted vertical bar to pivot laterally within the plane of the frame between said stationary vertical bars, said frame cooperating with a locking mechanism comprising in combination an upper linear horizontal locking bar with a pair of elliptical latching sleeves spaced apart coaxially on said locking bar to define a notch above said upper arch of said frame but pivotally mounted thereon by a pin through each minor axes and distal from the apex of said frame so as to cause the major axes of said pair of elliptical latching sleeves to project downwardly by gravity and thusly trap and latch an upper end of said central pivotally mounted vertical bar in said frame when said locking bar is in the locked position, but also releasing said central pivotal bar and the cattle therefrom when said locking bar is manually rotated in an opposite direction thus causing the major axes of said elliptical latching sleeves to project perpendicularly to the plane of said frame.

2. The cattle stanchion with locking mechanism of claim 1 whereby a plurality of said frame units are linearly attached to each other and operated by a single upper linear and horizontal locking bar with a plurality of elliptical sleeve pairs for automatically admitting, restraining, and manually releasing, either simultaneously or individually, the heads of cattle.

3. The cattle stanchion and locking mechanism of claim 2 whereby a single latching sleeve may be manually lifted by an attendant to release a single animal from the frame.

4. In a self-locking and manually unlocking cattle stanchion, an improvement comprising a frame unit of connecting vertical and essentially horizontal bars, an upper horizontal bar arched slightly upward to form an apex and a bottom horizontal bar arched slightly downwardly to form a nadir thereby forming an essentially coplanar and rectangular frame for a central pivotally mounted vertical bar with an extension encircling the upper arch of said frame as a locking means for said pivotal bar at the apex of said arch, said pivotal bar also containing an angular weighted means near the bottom thereof to pivot said bar by gravity when unlocked thereby providing an enlarged open area for releasing an animal's head, and also said angular weighted means further providing a barrier to prevent cattle from incorrectly positioning their heads in said frame.

5. The cattle stanchion frame of claim 4 linerally attached to each other to accommodate a plurality of cattle.

6. In a self-locking and manually unlocking cattle stanchion, improved locking and latching mechanism comprising pairs of pivotal elliptical latching sleeves spaced apart coaxially on a linear bar and pinned to said bar through each minor axes but off-center to cause said sleeves to project downwardly by gravity forming a notch between them and latch an extension of a pivotally mounted frame member when said linear bar is rotated to cause the major axes of said elliptical sleeves to project downwardly into the plane of said frame.

7. The locking and latching mechanism of claim 6 whereby the linear bar may be extended over a plurality of linear stanchion frames for automatic locking or manually unlocking cattle, either simultaneously or individually.

8. A self-locking and manually unlocking cattle stanchion comprising in combination:
  A. an essentially coplanar and rectangular single unit frame of connecting vertical and horizontal bars for automatically and releasably restraining the neck of cattle, said frame comprising:
    1. a central bar pivotally mounted within the plane of said frame to automatically lock in a vertical position by an extension encircling a top arch of said frame when an animal's neck is thrust downwardly against said bar;
    2. two essentially horizontal bars connected to two of said vertical bars forming said frame, one said horizontal bar being arched slightly upward and the other said horizontal bar being arched slightly downward, said bars defining an arc of travel within the plane of said frame for the ends of said central pivotally mounted bar;
  B. a locking mechanism comprising in combination and cooperation with said extension of the central pivotally mounted bar:
    1. a linear bar mounted horizontally above the arch of said frame to rotate around its longitudinal axis by manual operation for either latching or unlatching said extension of said central pivotally mounted bar;
    2. a pair of elliptical latching sleeves spaced apart coaxially on said linear bar defining a notch above said arch of said frame and pivotally mounted thereon by a pin through each minor axis of said sleeves, each pin being distal from the apex of the arch to cause said sleeves to fall downwardly by gravity and latch said extension of said central pivotal bar when said linear bar is manually rotated to its locked position causing the major axes of said sleeves to project downwardly and coplanarly within the plane of said frame, releasing said extension and cattle from the stanchion in the following manner:

a. rotating the linear bar around its longitudinal axis to its unlocked position thereby causing the major axes of said sleeves to face perpendicularly to the plane of said frame;

b. manually lifting an edge of a single latching sleeve.

9. The cattle stanchion and locking mechanism of claim 8 whereby a plurality of single frame units are linearly attached to each other and operated by a single top linear horizontal bar with a plurality of elliptical latching sleeve pairs to simultaneously or individually release all cattle therefrom.

* * * * *